H. T. MILLER.
SLEIGH RUNNER FOR MOTOR VEHICLES.
APPLICATION FILED MAR. 2, 1920.

1,406,207.

Patented Feb. 14, 1922.

WITNESSES
George A. Myers

INVENTOR
H. T. Miller,
BY Munn & Co.
ATTORNEYS

UNITED STATES PATENT OFFICE.

HERBERT TYLER MILLER, OF ROCHESTER, NEW YORK.

SLEIGH RUNNER FOR MOTOR VEHICLES.

1,406,207. Specification of Letters Patent. Patented Feb. 14, 1922.

Application filed March 2, 1920. Serial No. 362,646.

*To all whom it may concern:*

Be it known that I, HERBERT TYLER MILLER, a citizen of the United States, and a resident of Rochester, in the county of Monroe and State of New York, have invented certain new and useful Improvements in Sleigh Runners for Motor Vehicles, of which the following is a specification.

My invention relates to sleigh runners adapted for attachment to the front wheels of a motor vehicle to facilitate the travelling of motor vehicles through snow of considerable depth, the runners sliding over the surface of the snow and packing the same beneath the wheels so that a firm bed is provided for the rear wheels of the vehicle.

It is a purpose of my invention to provide a sleigh runner of the above described character which is of simple and efficient construction and which may be quickly and securely attached to any conventional form of wheel.

I will describe one form of sleigh runner embodying my invention and will then point out the novel features thereof in a claim.

In the accompanying drawing.

Similar reference characters refer to similar parts in each of the views.

Figure 2:
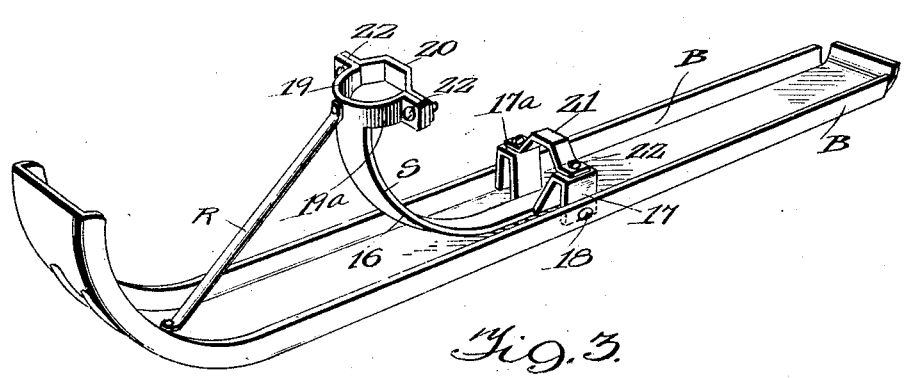
Figure 2 is a perspective view of the runner shown in Figure 1.
Figure 3:
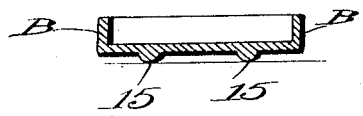
Figure 3 is a transverse sectional view of the runner shown in the preceding views showing the construction of the body of the runner.

Referring specifically to the drawings, B designates the body of the sleigh runner which, as illustrated to advantage in Figures 2 and 3, is formed of channel iron with its forward end curved upward in the form of an arc so as to properly pack and distribute the snow during the forward movement of the runner.

As illustrated to advantage in Figure 3, the under side of the body B is formed with longitudinally extending ribs 15 which are designed for the purpose of preventing lateral skidding of the runner. In the present instance the forward ends of the ribs terminate at a point rearwardly of the upwardly curved end of the body.

Figure 1:
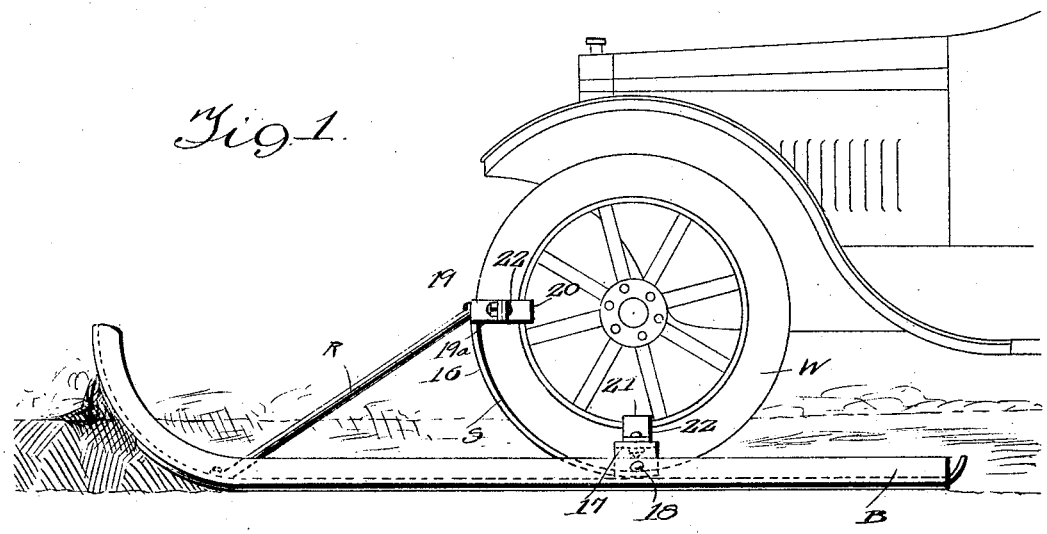
Figure 1 is a view showing in side elevation a front end of an automobile having applied thereto one form of sleigh runner embodying my invention.

The body B is firmly secured to the wheel W of the vehicle shown in Figure 1 by a saddle designated generally at S. As illustrated to advantage in Figure 2, the saddle S comprises a curved body 16 formed at its lower end with arms 17 and $17^a$ each of which arms are bent substantially in the form of a U with their outer side portions contacting with the vertical portions of the body B. These arms 17 and $17^a$ are preferably integrally formed with the body 16 and extend from the opposite edges of the same at opposite points. They are firmly secured to the vertical portions of the body B by bolts 18 so that the saddle as a unit is firmly connected to the runner. The saddle is braced against any forward bending by a brace rod R secured to the body B and the body 16 in the manner shown. The upper end of the body 16 is provided with curved arms 19 and $19^a$ which cooperate with a plate 20 to provide a clamp which is adapted to embrace the tire and rim of the wheel W. The arms 17 and $17^a$ are connected by a plate 21 so that it also provides a clamp for embracing the tire and rim of the wheel W. These plates 20 and 21 are removably associated with the saddle by means of bolts 22 so that they may be readily applied to or detached from the wheel W.

In the applied position of the sleigh runner as shown in Figure 1, the two clamps securely retain the runner in horizontal position upon the wheels W and the body 16 of the saddle S in contiguous relation with respect to the tread surface of the tire so that the sleigh runner as a unit is firmly secured to the wheel.

With sleigh runners of this character applied to each of the front wheels of a motor vehicle, it will be obvious that as the vehicle travels over the snow, the bodies B serve to pack the snow and thus provide relatively firm tracks for the rear wheels of the vehicle thereby materially aiding the vehicle in traversing the snow.

Although I have herein shown and described only one form of sleigh runner embodying my invention, it is to be understood that various changes and modifications may be made herein without departing from the spirit of the invention and the spirit and scope of the appended claim.

What I claim is:

A sleigh runner attachment for vehicle wheels comprising a channel bar curved at its forward end, a saddle arranged on the bar and comprising a single length of metal bent to provide a curved body, a pair of U-shaped arms on one end of the body and secured to the bar between and to the flanges thereof, and a second pair of arms on the opposite ends of the body, and plates of angular formation detachably secured to said pairs of arms and cooperating therewith to form clamps.

HERBERT TYLER MILLER.